US008605668B2

(12) United States Patent
Kubota et al.

(10) Patent No.: US 8,605,668 B2
(45) Date of Patent: Dec. 10, 2013

(54) COMMON CHANNEL CONFIGURATION FOR MULTIPOINT COMMUNICATIONS

(75) Inventors: Keiichi Kubota, Weybridge (GB); Brian Alexander Martin, Farnham (GB); Luis Miguel Santos Barreto, Camberley (GB); Christopher Peter Callender, Fleet (GB)

(73) Assignee: Renesas Mobile Corporation, Tokyo (JP)

( * ) Notice: Subject to any disclaimer, the term of this patent is extended or adjusted under 35 U.S.C. 154(b) by 244 days.

(21) Appl. No.: 13/096,085

(22) Filed: Apr. 28, 2011

(65) Prior Publication Data
US 2012/0275389 A1 Nov. 1, 2012

(51) Int. Cl.
H04W 4/00 (2009.01)
H04W 72/00 (2009.01)

(52) U.S. Cl.
USPC .......................................... 370/329; 455/450

(58) Field of Classification Search
None
See application file for complete search history.

(56) References Cited

U.S. PATENT DOCUMENTS

| | | | |
|---|---|---|---|
| 6,968,189 B1 | 11/2005 | Mullins et al. ................ 455/434 |
| 7,369,534 B2 | 5/2008 | Amerga et al. ................ 370/350 |
| 2001/0031638 A1 | 10/2001 | Korpela et al. ................ 455/449 |
| 2009/0191862 A1 | 7/2009 | Amirijoo et al. .............. 455/424 |
| 2010/0105392 A1* | 4/2010 | Cheng et al. .................. 455/437 |
| 2010/0248717 A1 | 9/2010 | Eerolainen .................... 455/434 |
| 2010/0278066 A1* | 11/2010 | Hole et al. ..................... 370/252 |
| 2011/0038310 A1 | 2/2011 | Chmiel et al. ................ 370/328 |
| 2011/0039539 A1 | 2/2011 | Maida et al. ............... 455/422.1 |
| 2011/0098054 A1* | 4/2011 | Gorokhov et al. ......... 455/452.1 |
| 2011/0188393 A1* | 8/2011 | Mallik et al. .................. 370/252 |
| 2011/0216732 A1 | 9/2011 | Maeda et al. ................. 370/329 |
| 2011/0269449 A1* | 11/2011 | Kazmi et al. ............... 455/422.1 |
| 2012/0135731 A1 | 5/2012 | Rangaiah et al. ............. 455/434 |
| 2012/0155576 A1 | 6/2012 | Jonsson et al. ................ 375/340 |
| 2012/0176918 A1 | 7/2012 | Callender et al. ............. 370/252 |
| 2012/0188976 A1* | 7/2012 | Kim et al. ..................... 370/329 |

FOREIGN PATENT DOCUMENTS

| | | |
|---|---|---|
| CN | 101262630 A | 9/2008 |
| CN | 101841868 A1 | 9/2010 |
| EP | 0 812 119 A2 | 12/1997 |
| EP | 1 973 356 A2 | 9/2008 |

(Continued)

OTHER PUBLICATIONS

3GPP TSG-RAN WG2 Meeting #45, Shin-Yokohama, Japan, (Nov. 15-19, 2004), Change Request, R2-042701, (26 pages).

(Continued)

Primary Examiner — Clemence Han
(74) Attorney, Agent, or Firm — Stanton IP Law

(57) ABSTRACT

A user equipment UE obtains channel configurations from each of a serving cell and n neighbor cells which have been determined to be suitable for data communications with the UE, from which the UE creates a combined channel configuration and utilizes it for multipoint communications with those cells. In specific embodiments: the respective channel configurations are obtained from the respective cells' system information; the n neighbor cells are determined to be suitable by the UE comparing each cell's received signal strength/quality against a threshold. The UE may get a neighbor cell list NCL and the threshold and consider each cell on the NCL as one of the n neighbor cells if its signal strength/quality exceed the threshold, then the UE may acquire system information for only those n neighbor cells instead of all cells on the NCL. The UE then reports in uplink signaling that the n neighbor cells are suitable.

20 Claims, 8 Drawing Sheets

(56) References Cited

FOREIGN PATENT DOCUMENTS

| EP | 2 056 639 A2 | 5/2009 |
|---|---|---|
| EP | 2312886 A1 | 4/2011 |
| EP | 2 316 886 A1 | 5/2011 |
| EP | 2001254 A1 | 12/2012 |
| GB | 246857 A | 11/2010 |
| GB | 2490494 A | 7/2012 |
| GB | 2491617 A | 12/2012 |
| WO | WO 98/53632 | 11/1998 |
| WO | WO 2005/031985 A2 | 4/2005 |
| WO | 2006118393 A2 | 11/2006 |
| WO | WO 2006/118393 A2 | 11/2006 |
| WO | WO 2008/137354 A1 | 11/2008 |

OTHER PUBLICATIONS

R2-080181, 3GPP TSG-RAN WG2 Meeting #60bis, Sevilla, Spain, Jan. 14-18, 2008, Nokia Corporation, "UE Support for SON Automatic Neighbour Relation Function", (2 pages).

R2-102411, 3GPP TSG-RAN WG2 Meeting #69bis, Beijing, China, Apr. 12-16, 2010, Nokia Corporation, "Considerations on Automatic Neighbour Relations for UTRA", (4 pages).

R2-103148, 3GPP TSG-RAN WG2 Meeting #70, Montreal, Canada, May 10-14, 2012, Nokia Corporation, "Further Considerations on Automatic Neighbour Relations for UTRA", (2 pages).

R3-072117, 3GPP TSG-RAN WG2 Meeting #58, Jeju Island, Korea, Nov. 5-9, 2007, Qualcomm Europe, "Inter-RAT/Frequency Automatic Neighbour Relation Function", (pp. 1,3 & 5).

"3$^{rd}$ Generation Partnership Project; Technical Specification Group Radio Access Network; Radio Resource Control (RRC); Protocol specification (Release 10), Section 8.3.1", 3GPP TS 25.331 V10.3.1, Apr. 2011, 37 pgs.

Nokia, Joint 3GPP TSG RAN WG2 and WG3 on MBMS, Jan. 15-16, 2003, R2-030004, "Basic Principles for RRC State Handling for PMM Connected Mode UE for MBMS Data Reception", (5 pages).

\* cited by examiner

COMMON CHANNEL CONFIGURATION FOR MULTIPOINT COMMUNICATIONS

TECHNICAL FIELD

The exemplary and non-limiting embodiments of this invention relate generally to wireless communication systems, methods, devices and computer programs and, more specifically, relate to channel configurations and related control signaling for multipoint communications between a network and a user equipment.

BACKGROUND

The following abbreviations that may be found in the specification and/or the drawing figures are defined as follows:

3 GPP third generation partnership project
BCCH broadcast channel
DL downlink (network towards UE)
E-DCH enhanced dedicated (physical) channel
E-DPCCH enhanced dedicated physical control channel
E-DPDCH enhanced dedicated physical data channel
E-HICH E-DCH HARQ acknowledgement indicator channel
E-RGCH E-DCH relative grant channel
E-RNTI E-DCH radio network temporary identifier
FACH forward access channel
HARQ hybrid automatic repeat request
H-RNTI HS-DSCH radio network temporary identifier
HSPDA high speed downlink packet access
HS-DSCH high speed downlink shared channel
HS-DPCCH high speed dedicated physical control channel
NCL neighbor cell list
NodeB base station
RF radio frequency
RNC radio network controller
RRC radio resource control
SI system information
SIB system information block
UE user equipment
UL uplink (UE towards network)
UTRAN universal terrestrial radio access network Continuing improvements of the UTRAN system have recently included the investigation of a CELL-FACH enhancement which in part intends to improve cell reselection. A UE in the CELL-FACH state has no dedicated physical channel allocated to it, but instead it continuously monitors the FACH in the DL and is assigned a random access channel RACH for accessing an uplink transport channel. While in the CELL-FACH state the UE can have only one serving cell, and so it performs cell reselection according to specified reselection rules, typically to change the current serving cell to a better quality neighbor cell.

In current specifications the UE does this by first obtaining the system information of the neighbor cell (typically 1.28 seconds) then sends a cell update message upon cell reselection while in the in CELL-FACH state so that the network can provide a dedicated resource on the new serving cell for the UE. The network provides this resource in a Cell Update Confirm message, and the cell update procedure can take up to a full second to perform. These conventional procedures are detailed at 3GPP TS 25.331 v10.3.1 (2011-04) subclause 8.3.1. But until this cell update procedure is complete, the UE cannot perform dedicated data transmission and reception and so there is a time, on the order of up to a few seconds, during which service is disrupted due to the cell reselection.

Also, in Release-8 of UTRAN there was introduced an "Enhanced Uplink in CELL-FACH state and idle mode" feature, by which the UE cannot perform cell reselection when it has an uplink resource allocated to it by the network. So a UE capable of this enhanced uplink in CELL-FACH state and idle mode is at risk of losing its synchronization to its serving cell due to that cell reselection restriction. It is expected that the CELL-FACH enhancement noted above will address this particular issue (e.g., in 3GPP Release 11) by allowing reselection during an ongoing E-DCH transmission. But still some improvements are required to enable this while avoiding or minimizing other problems.

Finally, another problem arises where the UE's reception of both the serving cell and the detected neighbor cells are all relatively weak. In this case reception on only a single cell would be unreliable, and potentially under some fading conditions the UE may reselect back and forth between difference cells in a kind of ping-pong effect as a result of poor signal reception which is only transient at the UE. Reception from multiple cells simultaneously would increase the reliability since the UE could then combine the successful reception from different cells. On balance this could potentially reduce the uplink signaling load since the UE would engage in fewer total reselections and corresponding cell update procedures.

Exemplary embodiments detailed below with particularity provide solutions to the above problems in that they detail UE and network actions for multipoint reception at the UE in the CELL-FACH state from multiple network cells.

SUMMARY

The foregoing and other problems are overcome, and other advantages are realized, by the use of the exemplary embodiments of this invention.

In a first exemplary embodiment of the invention there is a method comprising: obtaining channel configurations from each of a serving cell and n neighbor cells which have each been determined to be suitable for data communications with a user equipment, in which n is an integer at least equal to one; creating at the user equipment a combined channel configuration from the obtained channel configurations; and utilizing the combined channel configuration for multipoint communications with the serving cell and the n neighbor cells.

In a second exemplary embodiment of the invention there is an apparatus comprising at least one processor and at least one memory storing a computer program. In this embodiment the at least one memory with the computer program is configured with the at least one processor to cause the apparatus to at least obtain channel configurations from each of a serving cell and n neighbor cells which have each been determined to be suitable for data communications, in which n is an integer at least equal to one; create a combined channel configuration from the obtained channel configurations; and utilize the combined channel configuration for multipoint communications with the serving cell and the n neighbor cells.

In a third exemplary embodiment of the invention there is a computer readable memory storing a computer program which when executed result in actions comprising: obtaining channel configurations from each of a serving cell and n neighbor cells which have each been determined to be suitable for data communications with a user equipment, in which n is an integer at least equal to one; creating a combined channel configuration from the obtained channel configurations; and utilizing the combined channel configuration for multipoint communications with the serving cell and the n neighbor cells.

DETAILED DESCRIPTION

Figure 1:
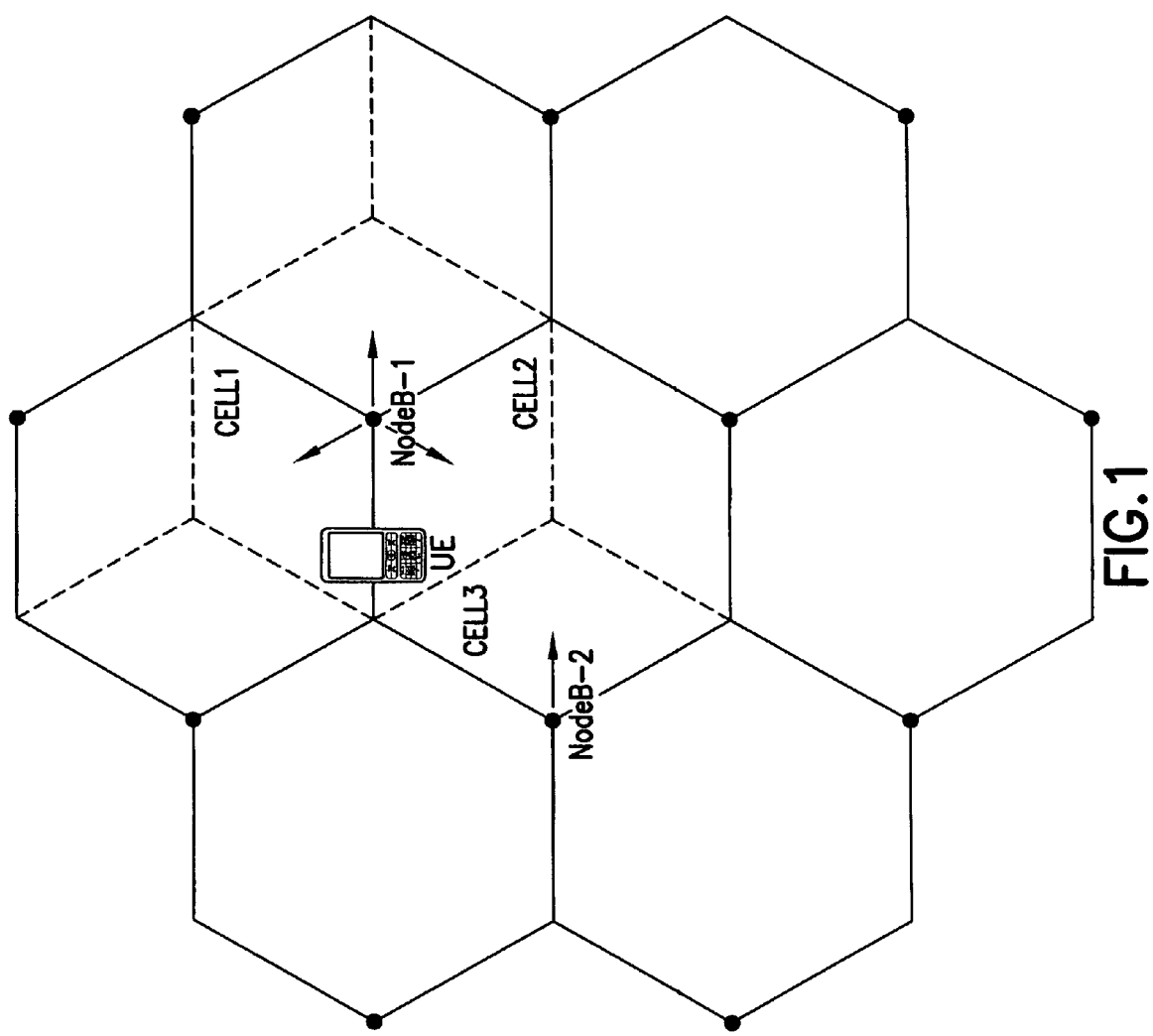
FIG. 1 is a schematic diagram of adjacent NodeBs with a UE moving amongst their cells and is an environment in which embodiments of the invention may be advantageously practiced.

Consider FIG. 1 which illustrates an exemplary environment in which exemplary embodiments of the invention may be practiced to advantage. There is a UE in a CELL-FACH state and under control of a serving cell denoted as cell 1. The UE is moving towards two neighbor cells, cell 2 which is also under control of the same NodeB-1 and cell 3 which is under control of a different NodeB-2. Conventionally the geographic area controlled by a NodeB is served by directional antennas. A given NodeB may control several cells, typically arranged in different sectors (e.g., three or six sector sites). While cell 1 and cell 2 may be considered from the network perspective different sectors of the same NodeB cell, since each sector has a different physical configuration the UE sees each sector as a different cell. Similarly, if a NodeB also has relay nodes and/or remote radio heads, the UE will also see those as separate cells rather than distinct sectors under a given NodeB's control. The description below uses the term cell in reference to the network access node which controls a sector (or which controls an entire geographic area of a cell if there are no sector divisions). Any of the cells may be remote from the NodeB or may be the NodeB itself.

While the exemplary embodiments of the invention below are described in the context of the UTRAN system and specifically HSDPA, such context is for clarity of description and is not itself a limit; these teachings may be employed in that and in other radio access technologies such as evolved UTRAN, WCDMA and others.

As an overview, these teachings provide an approach by which the UE in the FACH state can efficiently engage in multipoint communications with the serving cell 1 and any one or more of the neighbor cells cell 2 and cell 3. As will be seen this is also efficient from the network's perspective and further enables seamless and quick handovers between the involved cells without data loss. Specifically, the UE will store system information from multiple cells, and signal to the network the stored cells. The efficiency on the UE side arises in that the UE combines the common channel configuration information from the different cells to create a "single" or combined configuration by which the UE may receive FACH data from the network from multiple sources. Efficiency arises on the network side in that the network can signal to the UE from any one or more of those cells, reducing the likelihood of the UE losing data due to poor reception quality form any single one of them.

Figure 2:
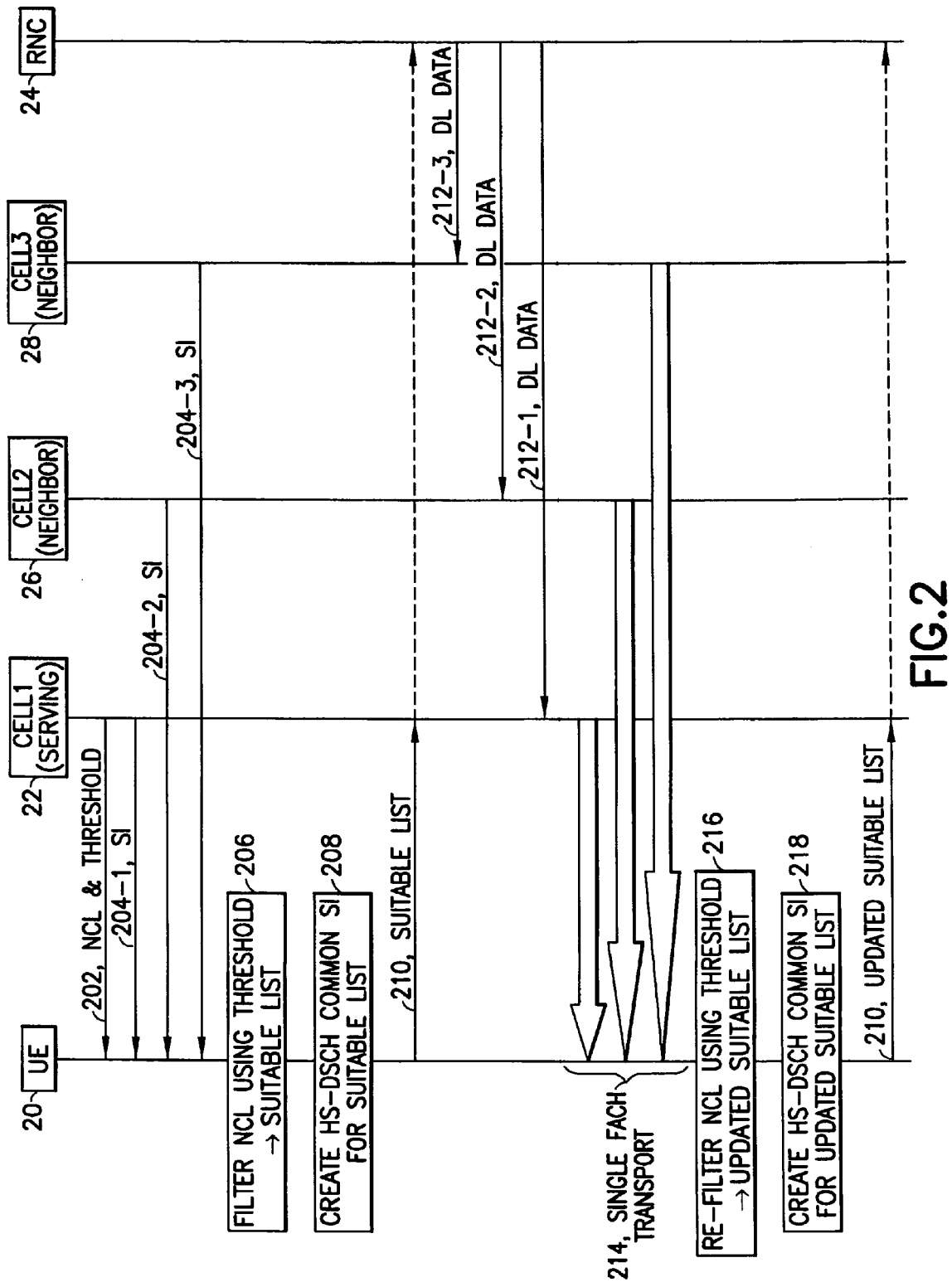
FIG. 2 is a signaling diagram showing a UE obtaining common channel configurations from the cells shown in FIG. 1 and creating a combined configuration from them by which the network can send multipoint communications according to an exemplary embodiment of the invention.

FIG. 2 is a signaling diagram giving an overview of one exemplary embodiment for creating the single combined configuration and informing the network of which cells are suitable/available for data communications using that combined configuration. The network may then send multipoint communications to the UE via any number of those cells. At FIG. 2 the UE is in the CELL-FACH state at least when receiving the FACH at message 214. The UE may be in the CELL-FACH state throughout all of the FIG. 2 signaling, or it may be in an idle state and the network commands the UE to move to the CELL-FACH state during some packet-switched data session any time prior to message 214.

At FIG. 2 the serving cell 22 sends to the UE 20 a neighbor cell list NCL and a threshold and/or other filtering criteria to be explained with reference to block 206. Message 202 may be a UE-specific message such as when the UE first becomes established in the cell 22 or when it first registers in the UE registration area, or message 202 (or at least the threshold/criterion) may be incorporated into the SI which the serving cell 22 broadcasts at message 204-1. The network may provide the NCL and the threshold to the UE 20 in different messages (e.g., NCL at registration with the serving cell 22 and threshold in SI).

In this example assume the NCL includes neighbor cell 26 which is under the same NodeB as the serving cell, and also neighbor cell 28 which is under a different NodeB. For simplicity assume both of those NodeB's are under the same RNC 24, but in certain embodiments in which they are under different RNCs the DL data coordination 212-3 shown at the RNC 24 of FIG. 2 for neighbor cell 28 will then be done higher in the network (e.g., in the core network such as at the SSGN or GGSN). Regardless, the UE 20 tunes to the BCCH of the neighbor cells 26, 28 which are listed in the NCL and receives their respective SI at 204-2 and 204-3.

The UE 20 has now received the individual common channel configuration from multiple cells 22, 26 and 28 which was broadcasted in SI of the serving cell 26 and other intra-frequency neighbor cells 26, 28. At block 206 the UE 20 then selects which of those cells from the NCL are suitable/available for data communications by filtering with the threshold and/or other filtering criteria it received from the network at 202. By example, message 202 may provide a first signal strength or channel quality threshold for adding a cell to its suitable list and a second threshold for dropping a cell from a list of candidate cells suitable/available for data communications, termed for convenience a 'suitable list'. The UE 20 measures signal strength or channel quality from each of the cells in the NCL, compares each against the first threshold, and if equal to or better than the threshold the UE 20 adds that particular cell to a suitable list. Later at block 216 the UE 20 will maintain/update its suitable list by re-filtering the NCL, adding to the suitable list any new cells which satisfy the first threshold and dropping from it any cells already on the suitable list which fail the second threshold. These thresholds may be absolute or relative thresholds, and in an embodiment there is only one threshold used for both add and drop decisions.

Additionally, the threshold (or only the first threshold if two are provided) may be used by the UE 20 to decide initially whether to even attempt to acquire SI on those neighbor cells 26, 28 in order to obtain that cell's common channel configuration. This reduces the UE's decoding efforts and therefore saves a bit of processing and battery power since the UE will only attempt to acquire only those SIs which the UE 20 expects to use. When used in this manner then the UE would listen to the SI at messages 204-2 and 204-3, check received signal strength/quality of those SI signals at block 206, filter at block 206 and then acquire those SIs which meet or exceed the threshold. In this case all of the cells for which SI is acquired are in the suitable list. Regardless of whether SI acquisition is prior to or after block 206, the UE stores in its local memory all of the common channel configurations (e.g., the "HS-DSCH common system information" acquired from the individual cells' SIB type 5/5 bis) of each individual cell in the suitable list.

Further to the filtering at block 206, other filtering criteria may include a "time to trigger" in addition to the threshold(s), which assure received signal strength/quality meets or exceeds the threshold for some continuous time interval, for example a few hundred milliseconds up to one or a few seconds (to prevent fading channel conditions causing a cell's received signal to intermittently meet then fail the threshold). In addition, hysteresis (lagging effect or path dependence) and cell individual offsets can be added to the above thresholds for determining when the UE autonomously attempts to acquire the SI and when it decides a cell can be dropped from the suitable list.

Another filtering criterion which the UE may use to determine when to begin or discontinue multipoint communications is a still further signal strength/quality threshold that is specific for the serving cell 22 only. In this case the UE 20 would stop HS-DSCH reception at 214 from the neighbor cell(s) 26, 28 if the serving cell signal quality is above or equal to this serving-cell specific threshold, and starts HS-DSCH reception from the neighbor cell(s) if the serving cell 22 signal strength/quality is below the threshold. This may be implemented as a single threshold, or as distinct add and drop thresholds to be applied against the serving cell signal strength/quality. Typically the best gains from multipoint operation arise when the UE is operating near the cell edge, where signal strength/quality from its serving cell is likely to be low. This embodiment therefore conserves battery power at the UE since multipoint communications can be initiated based on a low or diminishing serving cell strength/quality in order to assure continuous coverage for the mobile UE. Similarly, multipoint communications can be discontinued or not initiated based on a serving cell strength/quality which is sufficiently strong that the UE is reasonably assured of having coverage in the near-term from only the serving cell.

In addition to those serving cell thresholds listed above, the UE 20 may also consider its power supply status (e.g., residual power level) for determining whether starting or stopping HS-DSCH reception from some cell other than the serving cell. In this manner the UE 20 may avoid or reduce battery drain due to the multipoint HSDPA reception. Any or all of the above criteria may be used by the UE 20 to autonomously decide whether to initiate or discontinue multipoint communications, regardless of the signal strength/quality of the various neighbor cells in the suitable lists at blocks 206 and 216.

Alternative to thresholds and filtering criteria which are specific for multipoint communications filtering at blocks 206 and 216, instead the UE 20 can filter those cells in the NCL or previous suitable list using the network's cell reselection criteria, and include in the current suitable list only those cells which satisfy that reselection criteria. The common advantage in any of these implementations, apart from the UE's residual power level which may be fully autonomous within the UE, is that the network gets to specify the boundaries of which cell is and is not suitable/available for multipoint communications, and the UE 20 autonomously compiles the suitable list from its own signal strength/quality measurements of the various cells as compared against the thresholds/criteria.

In this example assume both neighbor cells 26, 28 in the NCL meet all the threshold/criteria of message 202 and so after the filtering the NCL at block 206 the suitable list includes them both. By example the suitable list may also include the serving cell, or it may be understood between the UE and the network that the serving cell 22 is always implicitly included in the suitable list. As noted above, the UE 20 has stored in its local memory all of the individual cell common channel configurations for the cells on its suitable list, which the UE 20 learned from acquiring the various SIs. Then at block 208, for all cells on the suitable list the UE 20 combines the individual configurations it received at 204-2 and 204-3 (or acquired after block 206) from each intra-frequency neighbor cell 26, 28, and also the individual configuration it received at 204-1 from the serving cell 22, to create a single combined configuration with which the UE 20 shall be able to combine the received data, and be able to switch the serving cell quickly without the need for loss of data. Block 208 notes a UTRAN specific implementation in which this combined configuration the UE creates is a HS-DSCH common SI. Then at message 210 the UE 20 informs the network of all the neighbor cells 26, 28 in its suitable list, or more generally indicates to the network all of the cells which are suitable/available for data communications with the UE 20. As above, this message 210 may or may not explicitly identify the serving cell 22, and by example the UE 20 sends 210 the suitable list to the RNC 24 via the serving cell 22.

Knowing the suitable list of cells, the network can then schedule data for the UE 20 on any combination of, or all of those cells, which the network does at 212-1, 212-2 and 212-3. The UE 20 will be able to receive this DL data from any one or combination of these cells on the suitable list as if it was a single FACH transport channel 214.

Block 216 has the UE 20 maintaining its suitable list as detailed above by re-filtering according to the thresholds/criteria, so that the re-filtered list is termed an updated suitable list. If the updated suitable list at block 216 differs from the suitable list first created at block 206, then the UE 20 creates a new combined common configuration for only those cells on the updated suitable list and at message 210 sends the updated suitable list to the network. Preferably the UE 20 will again acquire the SIB 5/5 bis for each cell on the updated suitable list in case there has been a semi-static change to any of their data, but in another embodiment the UE 20 can re-use from its local memory the earlier acquired SI for a cell which was on the original suitable list and which remains on the updated suitable list.

In another exemplary embodiment different from that shown at FIG. 2, the UE 20 is again in the CELL-FACH state during a packet-switched data session as commanded by the network. The UE 20 then detects a candidate intra-frequency neighbor cell 26, 28, and reads its SI without affecting the reception from the serving cell 22. The UE 20 may learn of the neighbor cell 26, 28 from its NCL or from blind detection scanning on the known intra-frequencies used in the radio access technology on which it is operating. With the possible filtering noted for FIG. 2 the UE 20 adds the new cell 26, 28 into the list of cells which it can receive from (similar to the suitable list) and reports that cell to the network, or as in FIG. 2 it reports a list of candidate cells that are suitable/available for data communications with the UE20. The network can then schedule data on any or all of those cells and the UE 20 shall be able to receive as if it was a single FACH channel as in FIG. 2. In this embodiment, if the original signal strength/quality of any of those included neighbor cells drops, the UE may remove the cell from the list of cells. In case it is the signal strength/quality of the serving cell 22 which drops and the serving cell 22 is removed from the list, the UE 20 can receive from, and service is maintained seamlessly on one or more of the other cells 26, 28 which remain on the list.

For either of the above embodiments the reporting by the UE 20 of the neighbor cell or suitable list is in one embodiment in an UL RRC message (e.g., a Radio Resource Control Measurement report) and in another embodiment in UL signals the neighbor cell or suitable list over an UL physical channel (such as HS-DPCCH, E-DPCCH or E-DPDCH). Similar RRC or physical channel reporting is for the updated suitable list at message 210 of FIG. 2, or alternatively if the reporting is per-cell rather than list-wise the UE 20 may report there that a specific neighbor cell which was previously reported as suitable/available is no longer suitable/available.

At FIG. 2 it is assumed the UE 20 will be prepared to receive from any of the cells 22, 26, 28 which are in its reported suitable list once the UE 20 sends that list at message 210 to the network, and the network simply schedules DL data through them all. Alternatively, the network may send additional signaling (e.g., an RRC message such as one of the reconfiguration messages: Radio Bearer Setup, Radio Bearer Reconfiguration, Radio Bearer Release, Transport Channel Reconfiguration, and Physical Channel Reconfiguration) to the UE 20 commanding the UE 20 to use specific ones of the reported suitable/available cells for data reception and/or transmission. Note that while FIG. 2 illustrates DL multipoint communications, the UE 20 may also or alternatively create a common channel configuration for the UL on which the UE sends data that is received by each cell 22, 26, 28 in the suitable list. Also not shown at FIG. 1 is the network further signaling, such as at message 202 or in the serving cell's SI at 204-1 (e.g., SIB3), that the network supports multi-cell communications.

One technical effect of this embodiment is that the UE 20 obtains the configuration for the combined HS-DSCH autonomously from SI, which reduces the network's complexity and signaling load. Another technical effect is that the UE can use additional serving cells without wasting network resources by adding the neighbor cells only when they are available for data reception and/or transmission, and further by removing the cells which are no longer available for data reception and/or transmission.

FIGS. 3A-4B are more particularized signaling diagrams extending the principles of FIG. 2, but these diagrams assume that only a single neighbor cell 26 is suitable (due to the threshold/filtering criteria/reselection criteria) for data communications rather than two neighbor cells 26, 28. The serving cell 22 is of course suitable. Not shown specifically but implied for each of these Figures is a separate block by which the UE 20 combines the channel configurations of the various suitable cells 22, 26.

Figure 3A:
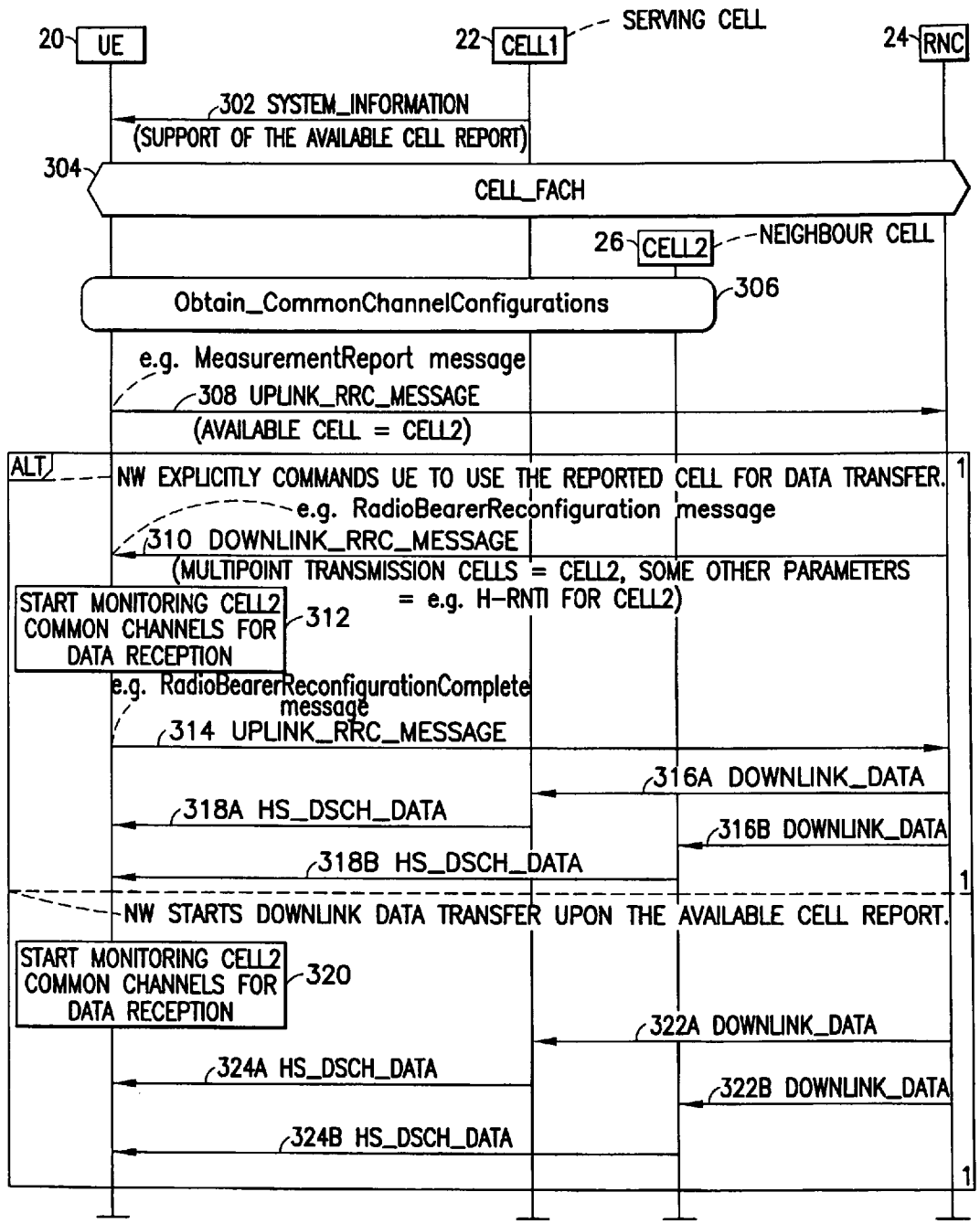
FIG. 3A is a signaling diagram illustrating processes for adding a neighbor cell for data communications and reporting same to the network via an RRC message according to an exemplary embodiment of the invention.
Figure 3B:
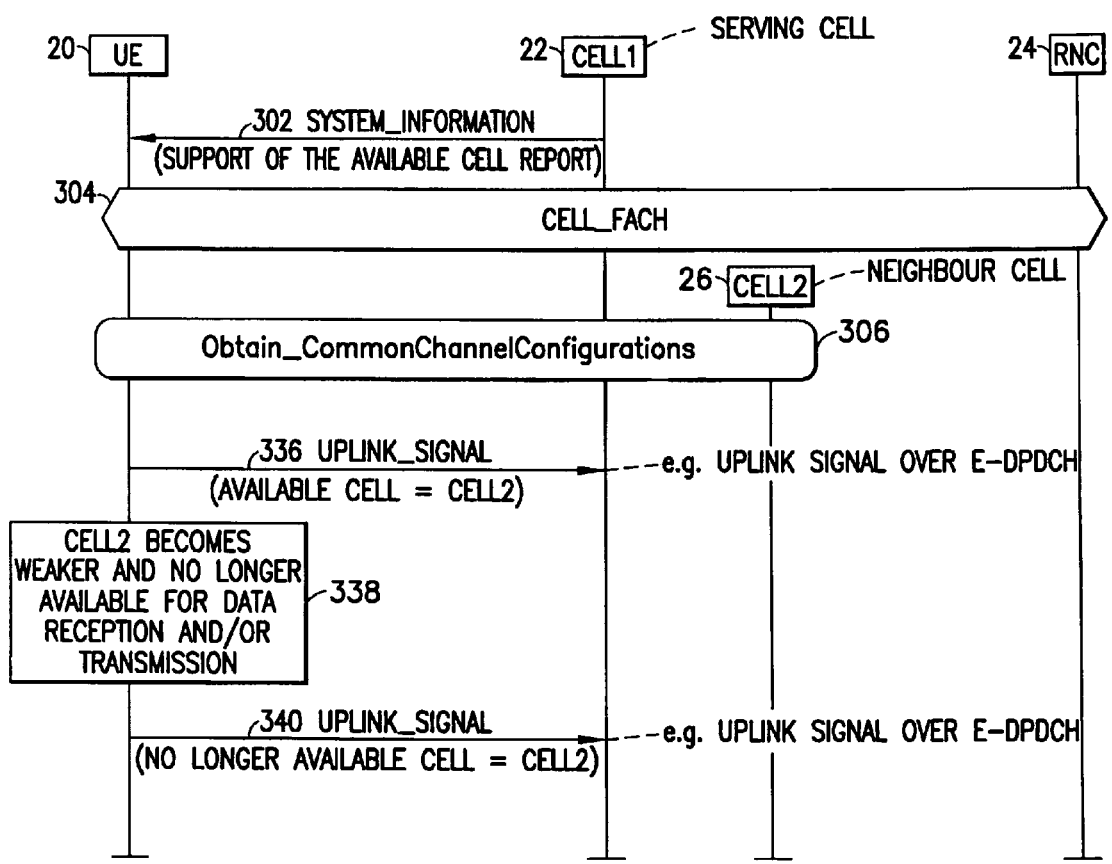
FIG. 3B is a signaling diagram similar to FIG. 3B but truncated and showing the suitable neighbor cell reporting as suitable and no longer suitable via signaling on a physical channel according to an exemplary embodiment of the invention.

FIG. 3A is directed to the embodiment in which a neighbor cell is reported as suitable/available to the network via RRC signaling, and FIG. 3B modifies FIG. 3A in that the UL reporting is over a physical channel. At FIG. 3A the network signals via the SIB3 302 of the serving cell 22 that it supports multiple suitable/available cells for data communications, as well as the NCL. At 304 the network commands the UE 20 to go into the CELL-FACH state and the UE 20 then obtains from the network at 306 the common channel configuration for the neighbor cell 26. The UE 20 measures the neighbor cell 26 and sends an UL RRC message 308 (e.g., a RRC Measurement Report message) to the RNC 24 indicating that the neighbor cell 26 is suitable for data communications.

In a first embodiment of FIG. 3A the network explicitly commands the UE to use the reported neighbor cell 26 for data transfer in a DL RRC message 310 (such as a Radio Bearer Setup, Radio Bearer Reconfiguration, Radio Bearer Release, Transport Channel Reconfiguration, or Physical Channel Reconfiguration message). This message 310 may also give the UE 20 any parameters for multipoint communications with the serving 22 and neighbor 26 cells which it might not have obtained at 306, such as for example the parameters H-RNTI for multipoint HS-DSCH reception operation and/or Primary E-RNTI, Secondary E-RNTI, E-RGCH, E-HICH for E-DCH for multipoint E-DCH transmission operation with the neighbor cell. At block 312 the UE 20 utilizes the channel configuration (and those parameters if necessary) to start monitoring the neighbor cell 26, and the UE 20 informs the network/RNC 24 via RRC signaling 314 (such as a Radio Bearer Setup Complete, Radio Bearer Reconfiguration Complete, Radio Bearer Release Complete, Physical Channel Reconfiguration Complete, or Transport Channel Reconfiguration Complete message) that it is ready to receive data from the neighbor cell 26 (as well as the already configured serving cell 22). The RNC 24 then sends DL data 316A to the serving cell 22 and the same DL data 316B to the configured neighbor cell 26, each of which wirelessly sends that same data 318A, 318B to the UE 20 in what the UE sees as a single FACH (HS-DSCH).

In an alternative embodiment further at FIG. 3A there is no explicit command 310 by the network; the UE 20 simply begins monitoring the neighbor cell 26 which it reported at 308 as being suitable for data communications, and the RNC 24 schedules DL data to the UE 20 via the serving cell 22 at 322A and 324A, and via the reported neighbor cell 26 at 322B and 324B. Data 322A-B are identical, as are 324A-B.

FIG. 3B is similar to FIG. 3A and like reference numbers are not again detailed for it. But the FIG. 3B embodiment finds the UE 20 utilizing UL signaling 336 on an uplink physical channel (such as HS-DPCCH, E-DPCCH or E-DPDCH) to signal the network (via the serving cell 22) that the neighbor cell 26 is suitable for data communications. In this embodiment both alternatives at FIG. 3A may also apply; the explicit command from the network to start using the reported neighbor cell or the automatic monitoring of it in reply to the UE 20 reporting it at 336 as suitable. DL data to the UE 20 then follows as in FIG. 3A. FIG. 3B additionally illustrates dropping that neighbor cell 26 once the UE 20 determines it no longer is suitable/available for data at 338. Then the UE 20 sends another UL message 340 on the physical channel (such as HS-DPCCH, E-DPCCH or E-DPDCH) to the serving cell 22 to indicate the neighbor cell 26 is no longer suitable and the network discontinues including the neighbor cell in how it distributes DL data for the UE 20.

Figure 4A:
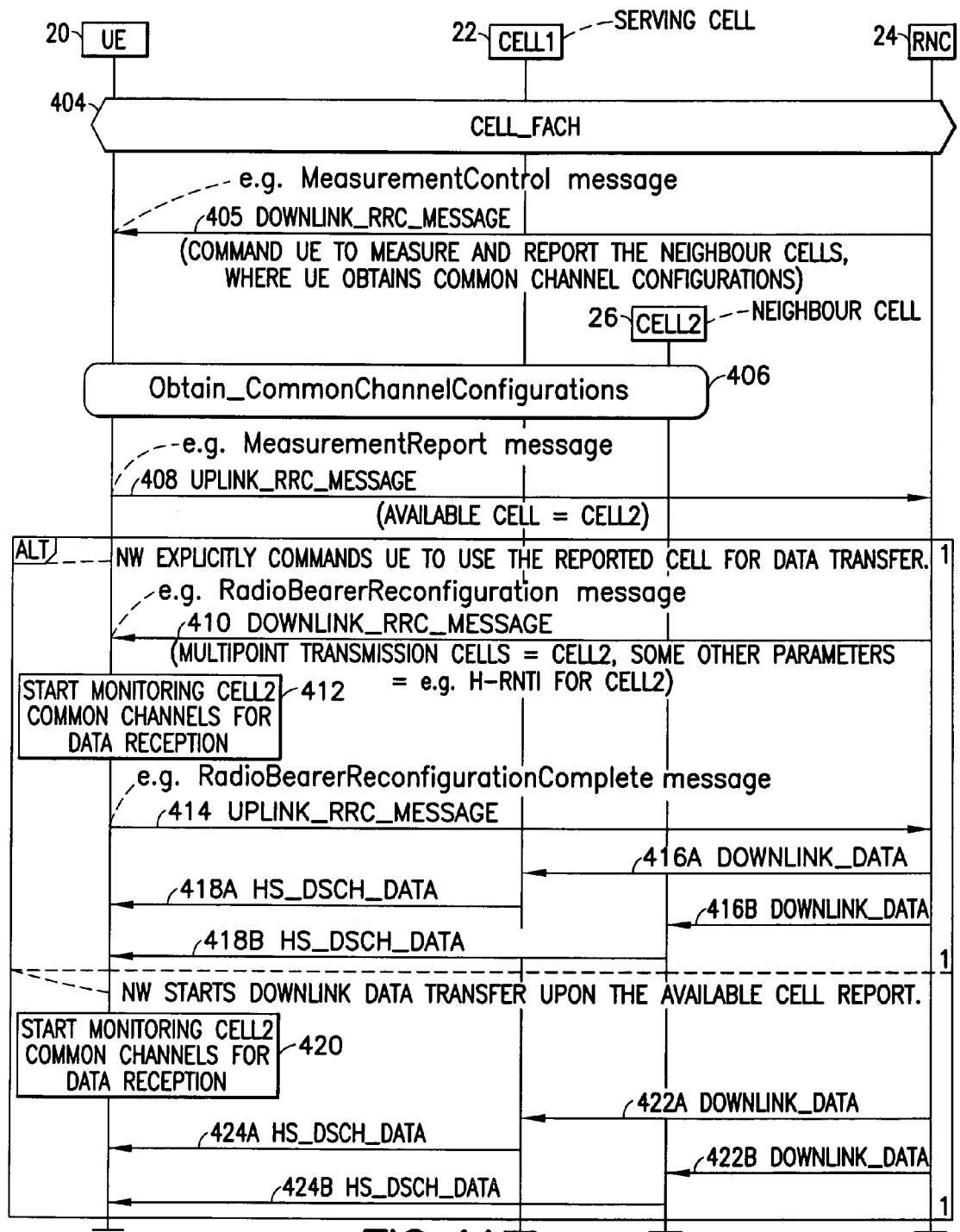
FIG. 4A is a signaling diagram similar to FIG. 3A but in which the network explicitly signals the UE via RRC signaling which cells to measure and report upon according to an exemplary embodiment of the invention.
Figure 4B:
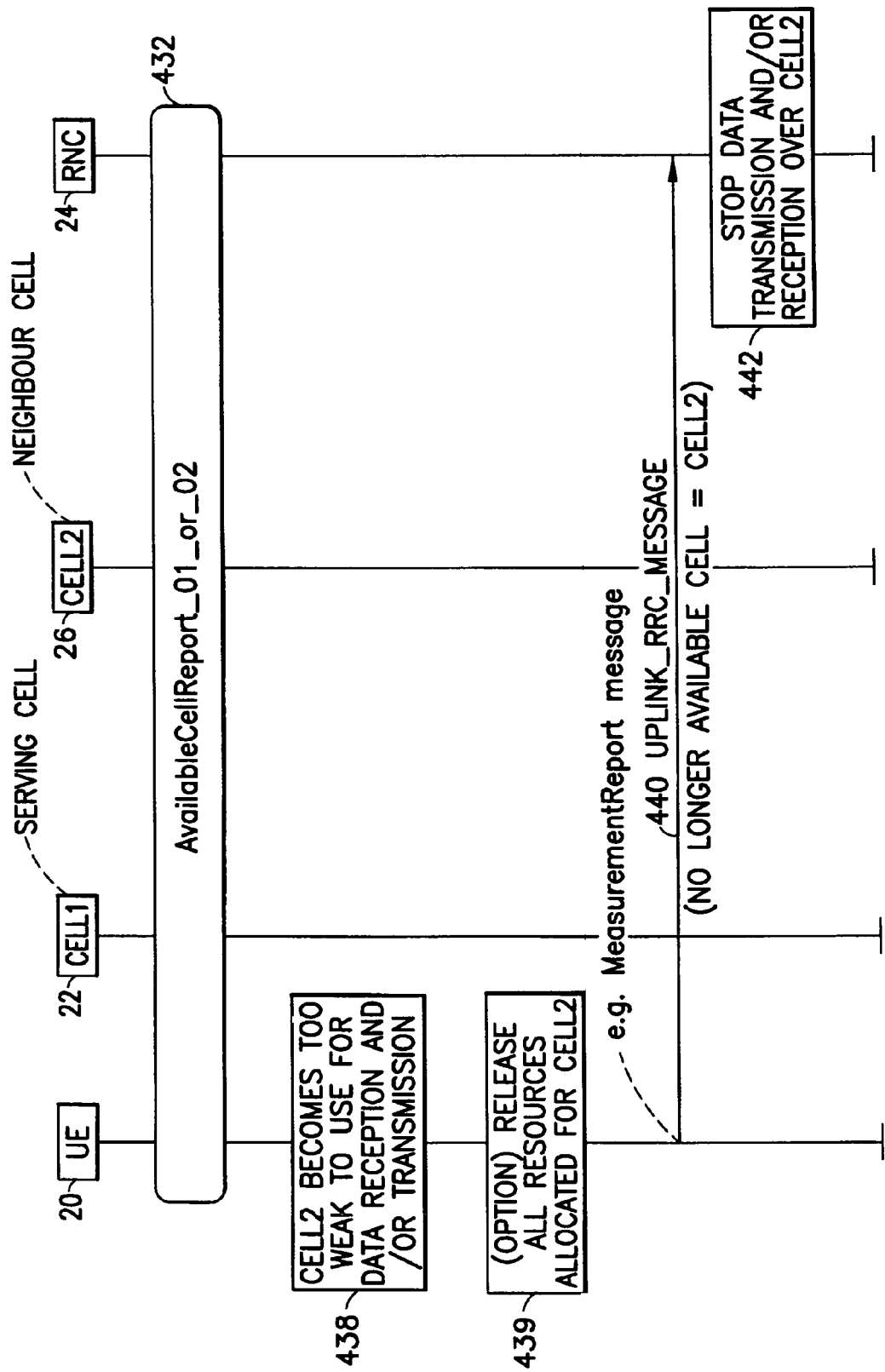
FIG. 4B extends the signaling diagram of FIG. 4A to show dropping a cell first added at FIG. 4A according to an exemplary embodiment of the invention.

Whereas FIG. 3A implies the UE 20 checks the SI of every cell in the NCL, FIG. 4A details an embodiment in which the network explicitly signals the UE via RRC signaling which cells to measure and report upon. FIG. 4B extends FIG. 4A to show dropping of the neighbor cell added at FIG. 4A.

The UE 20 is in the CELL-FACH state 404 and the network/RNC 24 sends a DL RRC message 405 (e.g., a RRC Measurement Control message) commanding the UE 20 to measure the neighbor cells that this message 405 identifies. The DL RRC message 405 also tells the UE where (what frequency) to obtain common channel configurations for the identified neighbor cell(s) 26, which the UE 20 does at 406. The UE 20 measures the neighbor cell 26 which FIG. 4A assumes meet the threshold/criteria for data communication, and so at 408 the UE 20 sends an UL RRC message (e.g., a RRC Measurement Report message) reporting the neighbor cell 26 as suitable.

In a first embodiment of FIG. 4A the network explicitly commands the UE in a DL RRC message 410 (such as a Radio Bearer Setup, Radio Bearer Reconfiguration, Radio Bearer Release, Transport Channel Reconfiguration, or Physical Channel Reconfiguration message) to use the reported neighbor cell 26 for data transfer. This message 410 may also give the UE 20 any parameters for multipoint communications with the serving 22 and neighbor 26 cells which it might not have obtained at 406. At block 412 the UE 20 utilizes the channel configuration to start monitoring the neighbor cell 26, and the UE 20 informs the network/RNC 24 via RRC signaling 414 (such as a Radio Bearer Setup Complete, Radio Bearer Reconfiguration Complete, Radio Bearer Release Complete, Physical Channel Reconfiguration Complete, or Transport Channel Reconfiguration Complete message) that it is ready to receive data from the neighbor cell 26 (as well as the already configured serving cell 22). The RNC 24 then sends DL data 416A to the serving cell 22 and the same DL data 416B to the configured neighbor cell 26, each of which wirelessly sends that same data 418A, 418B to the UE 20 in what the UE sees as a single FACH (HS-DSCH).

In an alternative embodiment further at FIG. 4A there is no explicit command 410 by the network; the UE 20 simply begins monitoring at block 420 the neighbor cell 26 which it reported at 408 as being suitable for data communications, and the RNC 24 schedules DL data to the UE 20 via the serving cell 22 at 422A and 424A, and via the reported neighbor cell 26 at 422B and 424B. Data 422A-B are identical, as are 424A-B.

FIG. 4B extends FIG. 4A to drop that neighbor cell 26 from data communications with the UE 20. The UE 20 periodically measures signal strength/quality from at least those cells for which it reported are suitable, and at 432 reports (e.g., in an Available Cell Report message) that the neighbor cell 26 is still suitable. Sometime later the UE 20 finds at block 438 that the neighbor cell 26 is no longer suitable for data communications and in the FIG. 4B embodiment automatically and autonomously releases all of the radio resources allocated to the UE 20 for use with the neighbor cell 26. The UE 20 thereafter sends an UL RRC message 440 (such as a RRC Measurement Report message) to the network/RNC 24 informing it that the neighbor cell 26 is no longer suitable, and the network stops utilizing that neighbor cell 26 for data communications with the UE 20. In another embodiment the release of radio resources is not autonomous by the UE 20 but after message 440 and prior to block 442 there is DL RRC signaling from the network to the UE 20 commanding their release.

Figure 5:
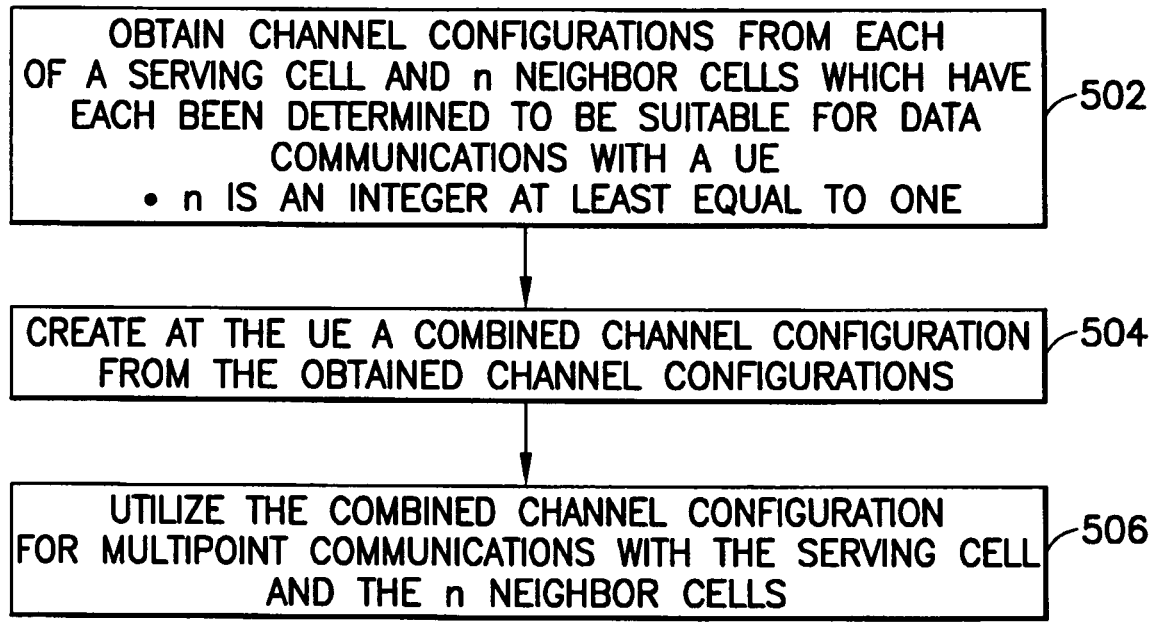
FIG. 5 is a logic flow diagram that illustrates the operation of a method, and a result of execution of computer program instructions embodied on a computer readable memory, in accordance with an exemplary embodiment of this invention.

Now are detailed with reference to FIG. 5 further particular exemplary embodiments from the perspective of the user equipment. FIG. 5 may be performed by the whole UE 20, or by one or several components thereof such as a modem. At block 502 the UE obtains channel configurations from each of a serving cell and n neighbor cells which have each been determined to be suitable for data communications with the UE. The variable n is an integer at least equal to one. Then at block 504 the UE creates a combined channel configuration from the obtained channel configurations, and at block 506 the UE utilizes the combined channel configuration for multipoint communications with the serving cell and the n neighbor cells.

In embodiments detailed above the UE obtains the respective channel configurations of block 502 from SI broadcast by the respective cells, and stores the received SIs or at least the obtained channel configurations in its local memory. In one such embodiment the UE determines the n neighbor cells to be suitable by comparing received signal quality of each respective nth cell against a threshold.

FIG. 5 is a logic flow diagram which may be considered to illustrate the operation of a method, and a result of execution of a computer program stored in a computer readable memory, and a specific manner in which components of an electronic device are configured to cause that electronic device to operate. The various blocks shown in FIG. 5 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 6:
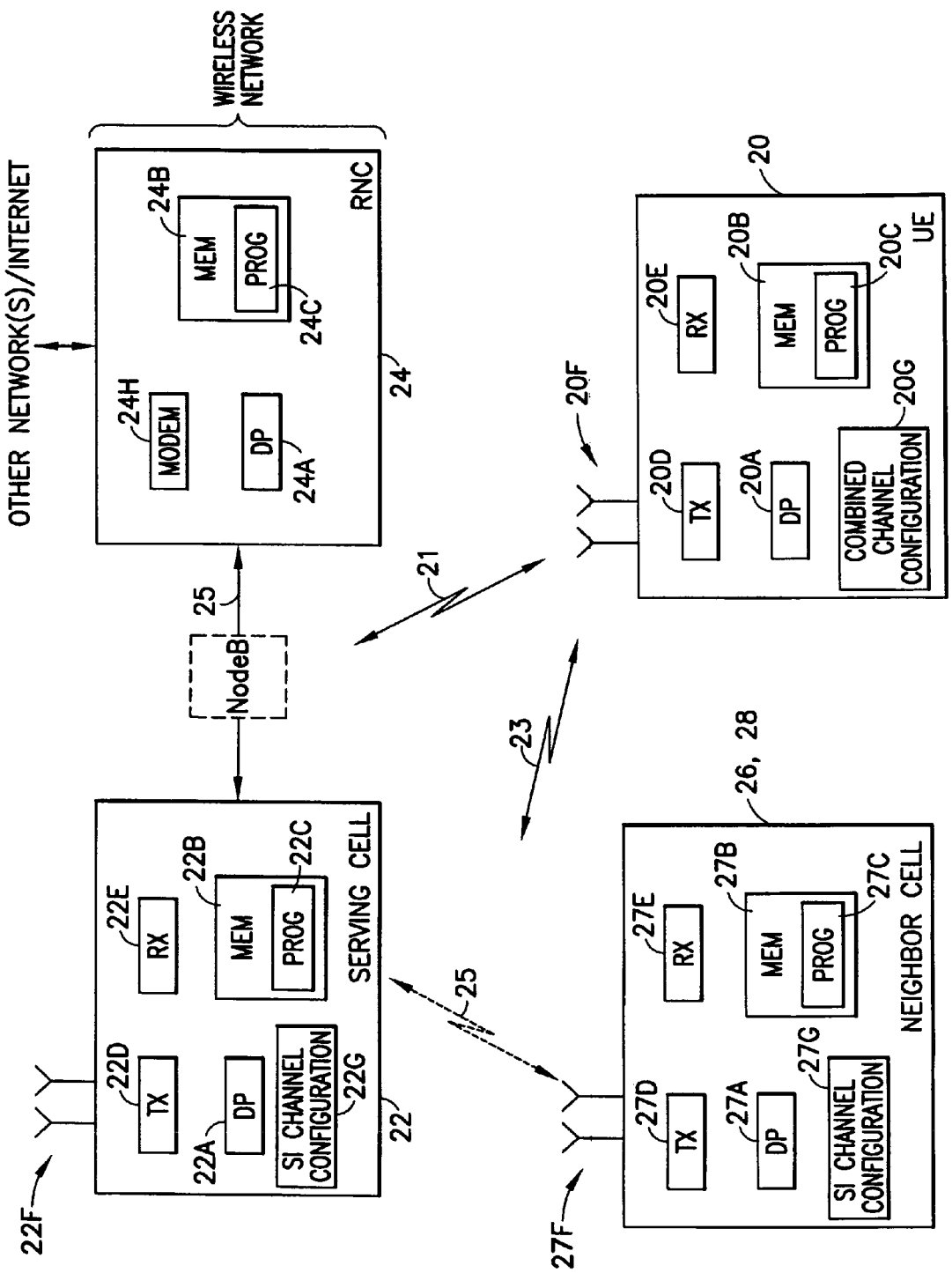
FIG. 6 is a simplified block diagram of the UE and two cells from FIG. 1 and also a higher network node, which are exemplary electronic devices suitable for use in practicing the exemplary embodiments of this invention.

Reference is now made to FIG. 6 for illustrating a simplified block diagram of various electronic devices and apparatus that are suitable for use in practicing the exemplary embodiments of this invention. In FIG. 6 a wireless network (serving cell 22, neighbor cell 26 or 28, NodeB if the serving and neighbor cells are other than the NodeB, and RNC 24) is adapted for communication over wireless links 21, 22 with an apparatus, such as a mobile terminal or UE 20. The network may include a network control element RNC 24, which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the node B 22 via one or more antennas 20F. Also stored in the MEM 20B at reference number 200 is the combined channel configuration which the UE created from the individual channel configurations of the serving 22 and neighbor 26, 28 cells, as detailed above.

The serving cell 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. The neighbor cell is functionally similar with blocks 27A, 27B, 27C, 27D and 27E, and both the serving cell 22 and the neighbor cell 26, 28 also store at 22G and 27G their respective channel configurations which in certain embodiments is broadcast in their respective SI. There is also a data and/or control path 25 coupling the neighbor cell 26, 28 and the serving cell 22 to the RNC 24 via the NodeB (if neither cell is the NodeB itself).

Similarly, the RNC 24 includes processing means such as at least one data processor (DP) 24A, storing means such as at least one computer-readable memory (MEM) 24B storing at least one computer program (PROG) 24C, and communicating means such as a modem 24H for bidirectional communications with the cells 22, 26, 28 via the data/control path 25. While not particularly illustrated for the UE 20 or cells 22, 26, 28, those devices are also assumed to include as part of their wireless communicating means a modem which may be inbuilt on an RF front end chip within those devices 20, 22, 26, 28 and which also carries the TX 20D/22D/27D and the RX 20E/22E/27E.

At least one of the PROGs 20C in the UE 20 is assumed to include program instructions that, when executed by the associated DP 20A, enable the device to operate in accordance with the exemplary embodiments of this invention, as will be discussed below in greater detail. The cells 22, 26, 28 and RNC 24 may also have software to implement certain aspects of these teachings for processing and signaling as detailed above. In these regards the exemplary embodiments of this invention may be implemented at least in part by computer software stored on the MEM 20B, 22B, 27B which is executable by the DP 20A of the UE 20 and/or by the DP 22A/27A of the cells 22, 26, 28, or by hardware, or by a combination of tangibly stored software and hardware (and tangibly stored firmware). Electronic devices implementing these aspects of the invention need not be the entire UE 20 or cell 22, 26, 28 or RNC 24, but exemplary embodiments may be implemented by one or more components of same such as the above described tangibly stored software, hardware, firmware and DP, or a system on a chip SOC or an application specific integrated circuit ASIC or a digital signal processor DSP.

In general, the various embodiments of the UE 20 can include, but are not limited to: data cards, USB dongles, cellular telephones; personal portable digital devices having wireless communication capabilities including but not limited to laptop/palmtop/tablet computers, digital cameras and music devices, and Internet appliances.

Various embodiments of the computer readable MEMs 20B and 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A/22A/27A/24A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the UTRAN system, it should be appreciated that the exemplary embodiments of this invention are not limited for use with only this one particular type of wireless communication system, and that they may be used to advantage in other wireless communication systems such as for example GERAN, E-UTRAN and others.

Further, the various names used in the above description (e.g., CELL-FACH state, names of the various channels) are not intended to be limiting in any respect, as different radio technologies may use different terms for similar concepts. Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method, comprising:
   obtaining channel configurations from each of a serving cell and n neighbor cells which have each been determined to be suitable for data communications with a user equipment, in which n is an integer at least equal to one;
   creating at the user equipment a combined channel configuration from the obtained channel configurations; and
   utilizing the combined channel configuration for multipoint communications between the user equipment and the serving cell with the n neighbor cells.

2. The method according to claim 1, in which the respective channel configurations are obtained from system information broadcast by the respective cells and the method further comprises storing the obtained channel configurations in a local memory of the user equipment.

3. The method according to claim 1, in which the n neighbor cells are determined to be suitable for data communications by the user equipment comparing received signal strength or received signal quality of each respective nth cell against a threshold.

4. The method according to claim 3, further comprising:
   receiving at the user equipment a neighbor cell list and the threshold;
   comparing at the user equipment received signal strength or received signal quality of each respective cell on the received neighbor cell list against the threshold;
   for each respective cell whose said received signal strength or received signal quality exceeds the threshold, adding the respective cell to a list of suitable cells for data communications, in which the list of suitable cells comprise the n neighbor cells;
   acquiring at the user equipment system information for each respective cell on the list of suitable cells; and
   reporting the list of suitable cells in uplink signaling.

5. The method according to claim 4, in which utilizing the combined channel configuration for the multipoint communications is autonomous by the user equipment once the n neighbor cells have each been determined to be suitable for data communications with a user equipment.

6. The method according to claim 4, in which utilizing the channel configuration for the multipoint communications is responsive to determining that received signal strength or received signal quality of the serving cell has fallen below a threshold, after the n neighbor cells have each been determined to be suitable for data communications with the user equipment.

7. The method according to claim 4, in which utilizing the combined channel configuration for the multipoint communications is responsive to a downlink command for the user equipment to begin data communications with the n neighbor cells, in which the downlink command follows the uplink signaling and comprises a Radio Bearer Setup, Radio Bearer Reconfiguration, Radio Bearer Release, Transport Channel Reconfiguration, or a Physical Channel Reconfiguration message.

8. The method according to claim 4, further comprising:
determining that one or more of the n neighbor cells are no longer suitable for data communications with the user equipment;
discontinuing data communications with the one or more cells by the user equipment autonomously releasing radio resources allocated for data communications between the user equipment and the one or more cells; and thereafter;
reporting in a second Radio Resource Control Measurement report that the one or more cells are no longer suitable for data communications with the user equipment.

9. The method according to claim 3, further comprising:
receiving at the user equipment a Radio Resource Control Measurement Control message identifying the n neighbor cells and information on where to obtain the channel configurations of the respective n neighbor cells; and
for each respective nth neighbor cell whose received signal strength or received signal quality exceeds the threshold, sending uplink signaling indicating that the respective nth neighbor cell is suitable for data communications with the user equipment, in which the uplink signaling comprises a first Radio Resource Control Measurement Report.

10. An apparatus comprising:
at least one processor and at least one memory storing a computer program; in which the at least one memory with the computer program is configured with the at least one processor to cause the apparatus to at least:
obtain channel configurations from each of a serving cell and n neighbor cells which have each been determined to be suitable for data communications, in which n is an integer at least equal to one;
create a combined channel configuration from the obtained channel configurations; and
utilize the combined channel configuration for multipoint communications between a user equipment comprising the apparatus and the serving cell with the n neighbor cells.

11. The apparatus according to claim 10, in which the respective channel configurations are obtained from system information broadcast by the respective cells thereafter stored in the at least one memory.

12. The apparatus according to claim 10, in which the apparatus determines that the n neighbor cells are suitable for data communications by comparing received signal strength or received signal quality of each respective nth cell against a threshold.

13. The apparatus according to claim 12, in which the at least one memory with the computer program is configured with the at least one processor to cause the apparatus to further:
receive a neighbor cell list and the threshold;
compare received signal strength or received signal quality of each respective cell on the received neighbor cell list against the threshold;
for each respective cell whose said received signal strength or received signal quality exceeds the threshold, add the respective cell to a list of suitable cells for data communications, in which the list of suitable cells comprise the n neighbor cells;
acquire system information for each respective cell on the list of suitable cells; and
report the list of suitable cells in uplink signaling.

14. The apparatus according to claim 13, in which the apparatus comprises the user equipment the user equipment, which utilizes the combined channel configuration for the multipoint communications autonomously once the n neighbor cells have each been determined to be suitable for data communications with the user equipment.

15. The apparatus according to claim 13, in which the apparatus comprises the user equipment the user equipment, which utilizes the channel configuration for the multipoint communications in response to the user equipment determining that received signal strength or received signal quality of the serving cell has fallen below a threshold, after the n neighbor cells have each been determined to be suitable for data communications with the user equipment.

16. The apparatus according to claim 13, in which the apparatus comprises the user equipment, which utilizes the combined channel configuration for the multipoint communications in response to receiving a downlink command for the user equipment to begin data communications with the n neighbor cells, in which the downlink command follows the uplink signaling and comprises a Radio Bearer Setup, Radio Bearer Reconfiguration, Radio Bearer Release, Transport Channel Reconfiguration, or a Physical Channel Reconfiguration message.

17. The apparatus according to claim 13, in which the at least one memory with the computer program is configured with the at least one processor to cause the apparatus to further:
determine that one or more of the n neighbor cells are no longer suitable for data communications with the apparatus;
discontinue data communications with the one or more cells by autonomously releasing radio resources allocated for data communications with the one or more cells; and thereafter;
report in a second Radio Resource Control Measurement report that the one or more cells are no longer suitable for data communications with the user equipment.

18. The apparatus according to claim 12, in which the at least one memory with the computer program is configured with the at least one processor to cause the apparatus to further:
receive a Radio Resource Control Measurement Control message identifying the n neighbor cells and information on where to obtain the channel configurations of the respective n neighbor cells; and
for each respective nth neighbor cell whose received signal strength or received signal quality exceeds the threshold, send uplink signaling indicating that the respective nth neighbor cell is suitable for data communications with the user equipment, in which the uplink signaling comprises a first Radio Resource Control Measurement Report.

19. A computer readable memory storing a computer program which when executed result in actions comprising:
obtaining channel configurations from each of a serving cell and n neighbor cells which have each been determined to be suitable for data communications with a user equipment, in which n is an integer at least equal to one;
creating a combined channel configuration from the obtained channel configurations; and
utilizing the combined channel configuration for multipoint communications between the user equipment and the serving cell with the n neighbor cells.

20. The computer readable memory according to claim 19, in which the respective channel configurations are obtained from system information broadcast by the respective cells and the actions further comprise storing the obtained channel configurations in the computer readable memory which is a local memory of the user equipment; and the n neighbor cells are determined to be suitable for data communications by comparing received signal strength or received signal quality of each respective nth cell against a threshold.

* * * * *

UNITED STATES PATENT AND TRADEMARK OFFICE
CERTIFICATE OF CORRECTION

PATENT NO.         : 8,605,668 B2
APPLICATION NO.    : 13/096085
DATED              : December 10, 2013
INVENTOR(S)        : Keiichi Kubota et al.

It is certified that error appears in the above-identified patent and that said Letters Patent is hereby corrected as shown below:

In the Claims

Col. 14, Claim 15, line 8; delete the repeated words "the user equipment" so that the claim reads in relevant part: "...apparatus comprises the user equipment, which utilizes the...".

Signed and Sealed this
Twenty-fifth Day of February, 2014

Michelle K. Lee
*Deputy Director of the United States Patent and Trademark Office*